US008822887B2

(12) United States Patent
Koonce

(10) Patent No.: US 8,822,887 B2
(45) Date of Patent: Sep. 2, 2014

(54) MULTI-MODE HEATER FOR A DIESEL EMISSION FLUID TANK

(75) Inventor: John Ross Koonce, Naples, FL (US)

(73) Assignee: Shaw Arrow Development, LLC, Naples, FL (US)

( * ) Notice: Subject to any disclaimer, the term of this patent is extended or adjusted under 35 U.S.C. 154(b) by 630 days.

(21) Appl. No.: 12/913,199

(22) Filed: Oct. 27, 2010

(65) Prior Publication Data
US 2012/0103433 A1    May 3, 2012

(51) Int. Cl.
*H05B 3/02* (2006.01)
*F02M 31/125* (2006.01)

(52) U.S. Cl.
CPC ............ *F02M 31/125* (2013.01); *Y02T 10/126* (2013.01)
USPC ............ 219/480; 219/202; 219/441; 392/441

(58) Field of Classification Search
USPC .......... 219/202–208, 480, 441; 392/458–459, 392/441
See application file for complete search history.

(56) References Cited

U.S. PATENT DOCUMENTS

| | | | |
|---|---|---|---|
| 2,862,354 A | 12/1958 | Barnhart | |
| 2,932,364 A | 4/1960 | Binter | |
| 2,975,586 A | 3/1961 | Bray | |
| 4,713,524 A * | 12/1987 | Leo et al. | 392/488 |
| 5,352,862 A * | 10/1994 | Barr | 219/205 |
| 5,549,383 A * | 8/1996 | Knoll et al. | 366/149 |
| 5,716,657 A * | 2/1998 | Liebermann | 426/232 |
| 6,051,811 A * | 4/2000 | Hardison | 219/213 |
| 6,080,969 A * | 6/2000 | Goto et al. | 219/444.1 |
| 6,681,811 B2 | 1/2004 | Channing | |
| 6,713,727 B1 * | 3/2004 | Johnson | 219/386 |
| 6,875,960 B2 * | 4/2005 | Yamaguchi et al. | 219/462.1 |
| 6,898,374 B1 * | 5/2005 | Wen | 392/459 |
| 7,015,428 B2 * | 3/2006 | Kirkman | 219/438 |
| 7,017,336 B2 | 3/2006 | Stiermann | |
| 7,497,075 B2 | 3/2009 | Ripper et al. | |
| 7,665,347 B2 | 2/2010 | Sasanuma et al. | |
| 7,677,631 B1 | 3/2010 | Zischke et al. | |
| D619,688 S | 7/2010 | Gismervik | |
| D621,015 S | 8/2010 | Gismervik | |
| D622,833 S | 8/2010 | Gismervik | |
| D625,396 S | 10/2010 | Gismervik | |

(Continued)

FOREIGN PATENT DOCUMENTS

| | | | |
|---|---|---|---|
| DE | 102004036508 | 3/2006 | |
| DE | 102009041938 A1 * | 9/2009 | F27D 1/00 |

(Continued)

*Primary Examiner* — Steven B McAllister
*Assistant Examiner* — Ko-Wei Lin
(74) *Attorney, Agent, or Firm* — Hahan Loeser & Parks LLP; Shannon V. McCue

(57) ABSTRACT

A heater assembly used in connection with a diesel emissions fluid tank in a vehicle, the heater assembly including a first heater connectable to an alternating current power supply; a second heater connectable to a direct current power supply within the vehicle; wherein the first heater is adapted to operate at a higher power than the second heater; wherein the first heater is closer to the tank than the second heater; a temperature sensor in sensing communication with the tank and adapted to provide a tank temperature; a control circuit connected to the second heater and the vehicle power supply, wherein the temperature sensor communicates the tank temperature to the control circuit, wherein the control circuit selectively activates the second heater to obtain a desired tank temperature.

18 Claims, 2 Drawing Sheets

(56) References Cited

U.S. PATENT DOCUMENTS

| | | | |
|---|---|---|---|
| 7,836,684 B2 | 11/2010 | Starck et al. | |
| 7,860,381 B2 * | 12/2010 | Wallhaeusser et al. | 392/485 |
| 7,886,525 B2 | 2/2011 | Nishibu et al. | |
| 7,895,831 B2 | 3/2011 | Chiba et al. | |
| 7,912,360 B2 * | 3/2011 | Gschwind | 392/456 |
| 7,918,086 B2 | 4/2011 | Surnilla et al. | |
| 7,954,312 B2 | 6/2011 | Gresens | |
| 7,954,313 B2 | 6/2011 | Hirata et al. | |
| 7,958,721 B2 | 6/2011 | Craig et al. | |
| 7,963,103 B2 | 6/2011 | Nagaoka et al. | |
| 7,963,104 B2 | 6/2011 | Girard et al. | |
| 7,963,106 B2 | 6/2011 | Schmidt et al. | |
| 7,966,811 B2 | 6/2011 | Reed | |
| 7,966,812 B2 | 6/2011 | Xu et al. | |
| 7,985,829 B2 | 7/2011 | Iyoda et al. | |
| 7,987,662 B2 | 8/2011 | Ruona | |
| 7,987,663 B2 | 8/2011 | Hancu et al. | |
| 7,992,377 B2 | 8/2011 | Brown | |
| 7,992,379 B2 | 8/2011 | Suzuki et al. | |
| 7,997,069 B2 | 8/2011 | Gonze et al. | |
| 7,997,070 B2 | 8/2011 | Yasui et al. | |
| 8,001,769 B2 | 8/2011 | Wei et al. | |
| 8,001,771 B2 | 8/2011 | Sheidler et al. | |
| 8,006,482 B2 | 8/2011 | Cox et al. | |
| 8,006,483 B2 | 8/2011 | Matsunaga et al. | |
| 8,033,096 B2 | 10/2011 | Nishina et al. | |
| 8,033,099 B2 | 10/2011 | Ohshima et al. | |
| 8,047,452 B2 | 11/2011 | Martin et al. | |
| 8,051,644 B2 | 11/2011 | Gonze et al. | |
| 8,051,645 B2 | 11/2011 | Chamarthi et al. | |
| 8,056,320 B2 | 11/2011 | Gonze et al. | |
| 8,056,321 B2 | 11/2011 | Gabe et al. | |
| 8,056,322 B2 | 11/2011 | Winkler et al. | |
| 8,056,324 B2 | 11/2011 | Wiley et al. | |
| 8,056,326 B2 | 11/2011 | Cox et al. | |
| 8,056,589 B2 | 11/2011 | Novak et al. | |
| 8,056,671 B2 | 11/2011 | Ikegami et al. | |
| 8,060,294 B2 | 11/2011 | Matsumoto | |
| 8,061,121 B2 | 11/2011 | Haugen | |
| 8,061,122 B2 | 11/2011 | Chaineux et al. | |
| 8,061,123 B2 | 11/2011 | Driscoll et al. | |
| 8,061,127 B2 | 11/2011 | Guo et al. | |
| 8,061,128 B2 | 11/2011 | Crosbie | |
| 8,065,870 B2 | 11/2011 | Jobson et al. | |
| 8,069,649 B2 | 12/2011 | Matsunaga | |
| 8,087,239 B2 | 1/2012 | Bugos et al. | |
| 8,088,336 B2 | 1/2012 | Suzuki et al. | |
| 8,096,112 B2 | 1/2012 | Dalton | |
| 8,104,269 B2 | 1/2012 | Gonze et al. | |
| 8,117,830 B2 | 2/2012 | Hiranuma et al. | |
| 8,117,833 B2 | 2/2012 | Sakimoto et al. | |
| 8,117,834 B2 | 2/2012 | Toshioka et al. | |
| 8,122,710 B2 | 2/2012 | Schmale et al. | |
| 8,127,538 B2 | 3/2012 | Pollitt et al. | |
| 8,168,923 B2 * | 5/2012 | Wong et al. | 219/387 |
| 8,183,503 B1 * | 5/2012 | Gupta | 219/482 |
| 8,183,505 B2 * | 5/2012 | Niederer et al. | 219/520 |
| 2002/0148827 A1 | 10/2002 | Watanabe et al. | 219/544 |
| 2004/0056022 A1 * | 3/2004 | Meiners et al. | 219/634 |
| 2005/0127056 A1 * | 6/2005 | Petkov et al. | 219/211 |
| 2007/0108187 A1 * | 5/2007 | Ding et al. | 219/492 |
| 2007/0157602 A1 | 7/2007 | Gschwind | |
| 2007/0183758 A1 * | 8/2007 | Bradenbaugh | 392/478 |
| 2008/0048081 A1 * | 2/2008 | Costa et al. | 248/241 |
| 2008/0143345 A1 | 6/2008 | Boudaoud et al. | |
| 2009/0028533 A1 | 1/2009 | Starck | |
| 2009/0038296 A1 | 2/2009 | Fukuda et al. | |
| 2009/0078692 A1 | 3/2009 | Starck | |
| 2009/0107116 A1 | 4/2009 | Barber et al. | |
| 2009/0127265 A1 | 5/2009 | Magnusson et al. | |
| 2009/0139214 A1 | 6/2009 | Reed | |
| 2009/0145903 A1 | 6/2009 | Soltis et al. | |
| 2009/0188923 A1 | 7/2009 | Versaw, Jr. et al. | |
| 2009/0189320 A1 * | 7/2009 | Bolick et al. | 264/511 |
| 2009/0205320 A1 | 8/2009 | Mokire et al. | |
| 2009/0230136 A1 | 9/2009 | Dougnier et al. | |
| 2009/0282813 A1 | 11/2009 | Kopinsky | |
| 2009/0302013 A1 * | 12/2009 | Kaastra | 219/121.64 |
| 2009/0308466 A1 * | 12/2009 | Haeberer et al. | 137/334 |
| 2010/0025408 A1 | 2/2010 | Haeberer et al. | |
| 2010/0028219 A1 | 2/2010 | Goebelbecker | |
| 2010/0050603 A1 | 3/2010 | Seino et al. | |
| 2010/0050606 A1 | 3/2010 | Fulks et al. | |
| 2010/0078426 A1 * | 4/2010 | Li et al. | 219/600 |
| 2010/0089037 A1 | 4/2010 | Bogema et al. | |
| 2010/0146940 A1 | 6/2010 | Goulette et al. | |
| 2010/0154907 A1 | 6/2010 | Lecea et al. | |
| 2010/0162690 A1 | 7/2010 | Hosaka et al. | |
| 2010/0175369 A1 | 7/2010 | Op De Beeck et al. | |
| 2010/0200567 A1 * | 8/2010 | Liu et al. | 219/546 |
| 2010/0220984 A1 | 9/2010 | Potier et al. | |
| 2010/0224284 A1 | 9/2010 | Kolberg et al. | |
| 2010/0236243 A1 | 9/2010 | Lolas et al. | |
| 2011/0016851 A1 | 1/2011 | Oriet et al. | |
| 2011/0016852 A1 | 1/2011 | Haeberer et al. | |
| 2011/0016853 A1 | 1/2011 | Tipton | |
| 2011/0023469 A1 | 2/2011 | Berke et al. | |
| 2011/0023470 A1 | 2/2011 | Bruck et al. | |
| 2011/0030349 A1 | 2/2011 | Makartchouk et al. | |
| 2011/0036076 A1 | 2/2011 | Gonze et al. | |
| 2011/0041484 A1 | 2/2011 | Bruck et al. | |
| 2011/0047988 A1 | 3/2011 | Lewis et al. | |
| 2011/0056191 A1 | 3/2011 | Ono et al. | |
| 2011/0079001 A1 | 4/2011 | Sakurai et al. | |
| 2011/0107744 A1 | 5/2011 | Seino et al. | |
| 2011/0126523 A1 | 6/2011 | Katoh et al. | |
| 2011/0131958 A1 | 6/2011 | Adelman et al. | |
| 2011/0131959 A1 | 6/2011 | Zhang | |
| 2011/0138787 A1 | 6/2011 | Radillo et al. | |
| 2011/0146245 A1 | 6/2011 | Farman et al. | |
| 2011/0146246 A1 | 6/2011 | Farman et al. | |
| 2011/0146247 A1 | 6/2011 | Nalla et al. | |
| 2011/0146248 A1 | 6/2011 | Charles et al. | |
| 2011/0146249 A1 | 6/2011 | Palluat de Besset et al. | |
| 2011/0185708 A1 | 8/2011 | Mccarthy, Jr. et al. | |
| 2011/0192151 A1 | 8/2011 | Overhoff et al. | |
| 2011/0197569 A1 | 8/2011 | Salanta et al. | |
| 2011/0239632 A1 | 10/2011 | Yano et al. | |
| 2011/0247316 A1 | 10/2011 | Dubkov et al. | |
| 2011/0247319 A1 | 10/2011 | Konno | |
| 2011/0265452 A1 | 11/2011 | Geveci et al. | |
| 2011/0265459 A1 | 11/2011 | Mupparapu et al. | |
| 2011/0265462 A1 | 11/2011 | Masuda | |
| 2011/0271660 A1 | 11/2011 | Gonze et al. | |
| 2011/0271662 A1 | 11/2011 | Winsor | |
| 2011/0271663 A1 | 11/2011 | Sato et al. | |
| 2011/0283677 A1 | 11/2011 | Kaefer | |
| 2011/0283678 A1 | 11/2011 | Zanetti et al. | |
| 2011/0283685 A1 | 11/2011 | Kotrba et al. | |
| 2011/0301868 A1 | 12/2011 | Anderson et al. | |
| 2012/0020857 A1 | 1/2012 | Isada et al. | |
| 2012/0031082 A1 | 2/2012 | Gismervik | |
| 2012/0225396 A1 * | 9/2012 | Harr et al. | 432/120 |

FOREIGN PATENT DOCUMENTS

| | | |
|---|---|---|
| EP | 1561626 | 10/2005 |
| JP | 2008267682 | 11/2008 |
| JP | 2009138551 | 5/2009 |
| JP | 2010156284 | 7/2010 |

* cited by examiner

US 8,822,887 B2

MULTI-MODE HEATER FOR A DIESEL EMISSION FLUID TANK

TECHNICAL FIELD

In general, the present invention relates to a heater assembly used in connection with diesel exhaust fluid in a tank. In particular, the present invention relates to a multiple mode heater assembly having a high power heater adjacent to the tank and a lower power heater located outward of the high power heater to separately apply higher and lower power heat to the tank to prevent freezing.

BACKGROUND OF THE INVENTION

Diesel emissions are an environmental concern that has limited application of diesel engines despite the fuel efficiency offered by these engines. To reduce harmful emissions, technologies that treat the exhaust gas downstream of the engine have been developed including selective catalytic reduction systems that inject a small quantity of diesel exhaust fluid (DEF) into the exhaust upstream of a catalyst where is vaporizes and decomposes to form ammonia and carbon dioxide. The ammonia ($NH_3$) converts nitrogen oxides (NOx) within the exhaust gas to harmless nitrogen ($N_2$) and water ($H_2O$). It has been estimated that DEF consumption is approximately 2% of fuel consumption within a typical diesel engine. Consequently, significant amounts of DEF must be stored in a tank or reservoir within a vehicle for dosing in the exhaust system. One DEF that has gained wide acceptance through regulation is an Aqueous Urea Solution on (AUS).

Aqueous Urea Solutions are effective in reducing nitrogen oxides (NOx) contained in the exhaust gas of an engine. One drawback, however, is the freezing temperature for Aqueous Urea Solution is about −11° C. (12° F.) placing it within the ambient temperature range of colder regions. To avoid freezing of the solution, it is known to use an electric resistance heater or heat exchanger using engine coolant to warm or thaw the Aqueous Urea Solution. The present invention improves upon these techniques.

SUMMARY OF THE INVENTION

The present invention generally includes two heaters that may be fastened to an external surface of a diesel exhaust fluid tank. The first heater is located closest to the tank and is a higher power heater. The second heater is spaced from the tank at least by the first heater. The second heater is a lower power heater.

According to additional concepts of the present invention, the first heater may be activated by connecting it to an external power source causing the heater to run continuously until disconnected from the power source. A thermostat may be provided to measure the first heater surface temperature or temperature of the heated fluid, and operate the heater in a desired temperature range.

According to additional concepts of the present invention, the lower power heater may be powered by the vehicle. This heater may by connected to a control module that communicates with a temperature sensor in the Aqueous Urea Solution and selectively activates the heater to regulate the Aqueous Urea Solution fluid temperature by cycling the heater on and off. The control circuit may include an override control that disables the heater upon detecting a temperature that would potentially degrade the fluid or cause system damage.

According to further concepts of the present invention, the first heater may directly contact the tank surface.

According to further concepts of the invention, the second heater may be bonded to the first heater.

According to still further concepts of the present invention, the heater assembly may be attached to a lower portion of the diesel engine fluid tank. The heater assembly may be attached to the bottom surface of the diesel engine fluid tank.

According to another concept of the present invention, thermal insulation may be used to reduce heat loss and improve heat flow to the fluid in the tank.

DETAILED DESCRIPTION OF THE INVENTION

Figure 1:
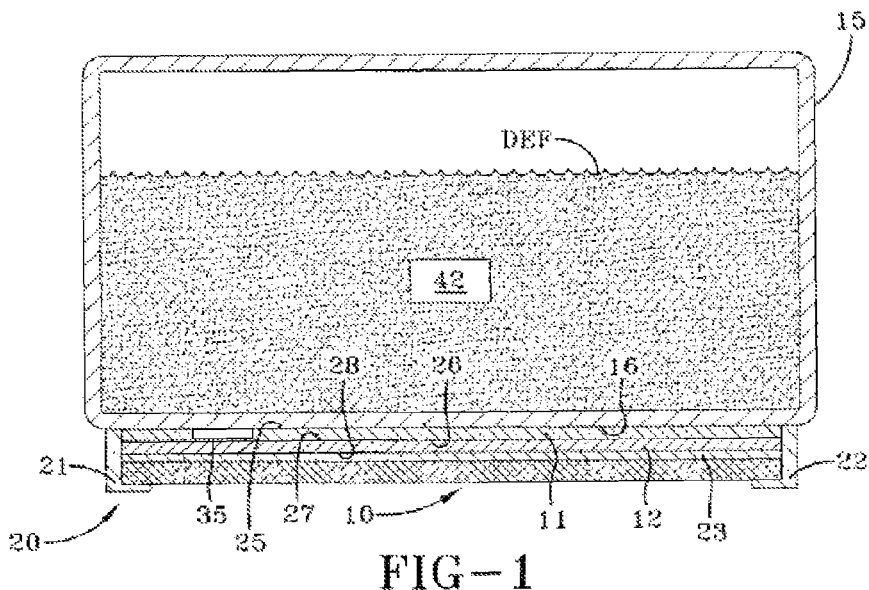
FIG. 1 is a schematic sectioned side elevational view of a diesel exhaust fluid tank having a multi-mode heater assembly according to the concepts of the present invention attached to the tank.
Figure 2:
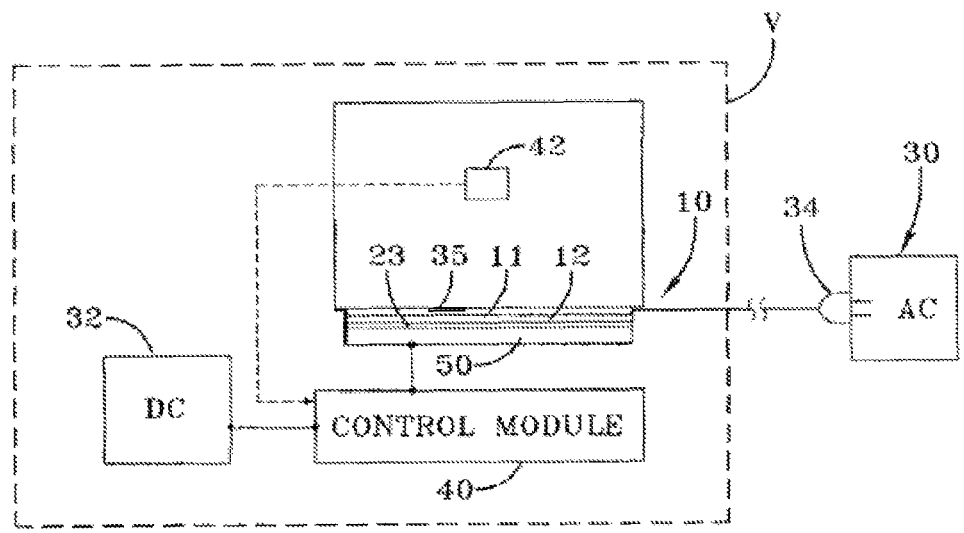
FIG. 2 is a schematic view of a multi-mode heater assembly system used in connection with a vehicle according to the concepts of the present invention.

A multimode heater assembly according to the concepts of the present invention is generally indicated by the number 10 in the accompanying drawings. Heater assembly 10 is used in connection with a tank 15 for holding a diesel emissions fluid (DEF). Tank 15 is generally a container capable of holding DEF for use in a vehicle V. Tank 15 has an outer surface that includes a base 16. The DEF may be an aqueous urea solution (AUS). To prevent the AUS from freezing, heater assembly 10 may be used in connection with tank 15 to maintain the DEF above its freezing temperature, for example, −11° C. for AUS. A heater assembly 10 generally includes a first heating element or first heater 11 and a second heating element or second heater 12. The first heater 11 is a higher power heater relative to the second heater 12. To that end, first heater 11 provides more intense heat to the DEF tank 15 than second heater 12. For example, in a locomotive application, first heater may be a 1,500 watt heater adapted to operate with 660 volt AC three-phase power supply and second heater may be a 550 watt heater adapted to operate with a 74 volt DC power supply. It will be appreciated that the heater assembly 10 may be applied to other vehicles and adapted for use with other power supplies. Depending on the vehicle application, the power of each heater 11, 12 may be vary in accordance with the size of the tank and amount of fluid that needs to be heated. Additional heater assemblies with a common power may be laid adjacent to each other to provide more heat and/or distribute heat over a larger surface. Other considerations may be the average operating temperatures for the vehicle.

As best shown in FIG. 1, first and second heaters 11, 12 may be supported by a support bracket generally indicated by the number 20. In the example shown, support bracket 20 includes first and second brackets 21, 22 that encompass the sides of heaters 11, 12 and a lower support plate 23 that extends below the first and second heaters 11, 12.

Heaters 11, 12 are arranged in a stacked configuration with the first heater 11 located closest to the tank 15. In the example shown, the first heater 11 is in contact with the base 16 of the tank 15. In this configuration, the maximum amount of heat may be transferred from the first heater 11 to the base 16 of tank 15. It will be appreciated, however, that other configurations may be used placing the first heater 11 in contact with various portions of the tank as desired. In addition, direct contact between the first heater 11 and the tank 15 is not necessary, but indirect heating may result in a lower rate of heat transfer than the configuration shown.

Second heater 12 is generally spaced outward from the first heater 11 and, as shown in the depicted example, may be in direct contact with the first heater 11. In this configuration, the first surface or upper surface 25 of first heater 11 contacts the tank 15 and the second or lower surface 26 of first heater 11 contacts a first or upper surface 27 of second heater 12. The second or lower surface 28 of second heater 12 may be supported by support plate 23 as shown.

First and second heaters 11, 12 may operate independently and may be powered by one or more power supplies. Each heater 11, 12 may have its own power supply. For example, first heater 11 may be powered by an alternating current (AC) voltage circuit 30. Second heater 12 may be powered by a direct current (DC) voltage supply circuit 32. In the example shown, the AC heating circuit 30 is external to the vehicle V such that the first heater 11 is connected to the AC heating circuit 30 by a connector 34 such as an electrical cord. To that end, the first heater 11 may be activated simply by plugging it into the AC voltage circuit 30. The first heater 11 may be operated continuously until it is unplugged from the AC voltage circuit 30.

A thermostat 35 or other temperature sensor may be provided to measure the surface temperature of first heater 11 and set to operate the first heater 11 in a selected temperature range to prevent over heating of the diesel emissions fluid or damage to the heaters 11, 12 or tank 15. To accommodate the thermostat 35, a sensor receiver may be formed in support plate 23 shown as a notch in plate 23. A similar notch may be formed in the insulation 50, which is described in more detail below. By placing the first heater 11 directly in contact with the surface of tank 15 the maximum heat sink is utilized to pull heat away from heater 11 and reduce its temperature. The second heater 12 has less heat sink because it is spaced from the tank 15. In the depicted example, second heater 12 is bonded to the lower surface 26 of first heater 11 and not directly to the tank 15. Since it is expected that the second heater 12 would have a higher surface temperature, second heater 12 is provided with a lower heat density, i.e., the amount of heat over its surface area, to prevent over heating of the heater 12. As graphically depicted, the second heater 12 may be connected to a DC voltage circuit 32 located within the vehicle V.

In operation of the depicted system, it is expected that the first heater 11 will be used to thaw a tank 15 of frozen DEF using an external alternating current voltage circuit 30 applying maximum heat to the tank 15. The second heater 12, which would be connected to a mobile DC voltage circuit 32 such as one located within the vehicle V would operate as needed to prevent freezing of the DEF or provide thawing when an AC circuit is not readily available.

A control module 40 may be connected to a temperature sensor 42 located within tank 15 that measures the temperature of the DEF. As shown, control module 40 may separate the second heater 12 and DC voltage circuit 32 to control application of the DC voltage to the second heater 12. In this arrangement, the second heater 12 and DC voltage circuit 32 are each electrically connected to the control module 40. The control module 40 selectively connects DC voltage circuit 32 to second heater 12 by control module 40 may be constant or delivered in a pulsatory or other programmed manner to perform thawing or obtain a selected temperature. For example, when control module 40 detects a temperature indicating a potential for freezing of the DEF, control module 40 activates second heater 12 by supplying power from the DC voltage circuit 32 to second heater 12. When the temperature seen by temperature sensor 42 reaches an acceptable level, control module 40 may deactivate the second heater 12. The control module 40 may be any circuit, programmable logic controller, or processor based controller capable of regulating operation of the heating element(s).

As an alterative to the arrangement described above, with respect to first heater 11, the control module 40 may be used in the same fashion to control application of heat to the first heater 11 by locating the control module 40 between the first heater 11 and the AC voltage circuit 30. In contrast to the previous described example, rather than relying on plugging and unplugging the first heater 11 into the AC voltage circuit 30 to control activation of the first heater 11, the control module would monitor the temperature of the fluid within the tank 15 to selectively activate or deactivate the first heater 11 by controlling the supply of current from the AC voltage source 30.

Figure 3:
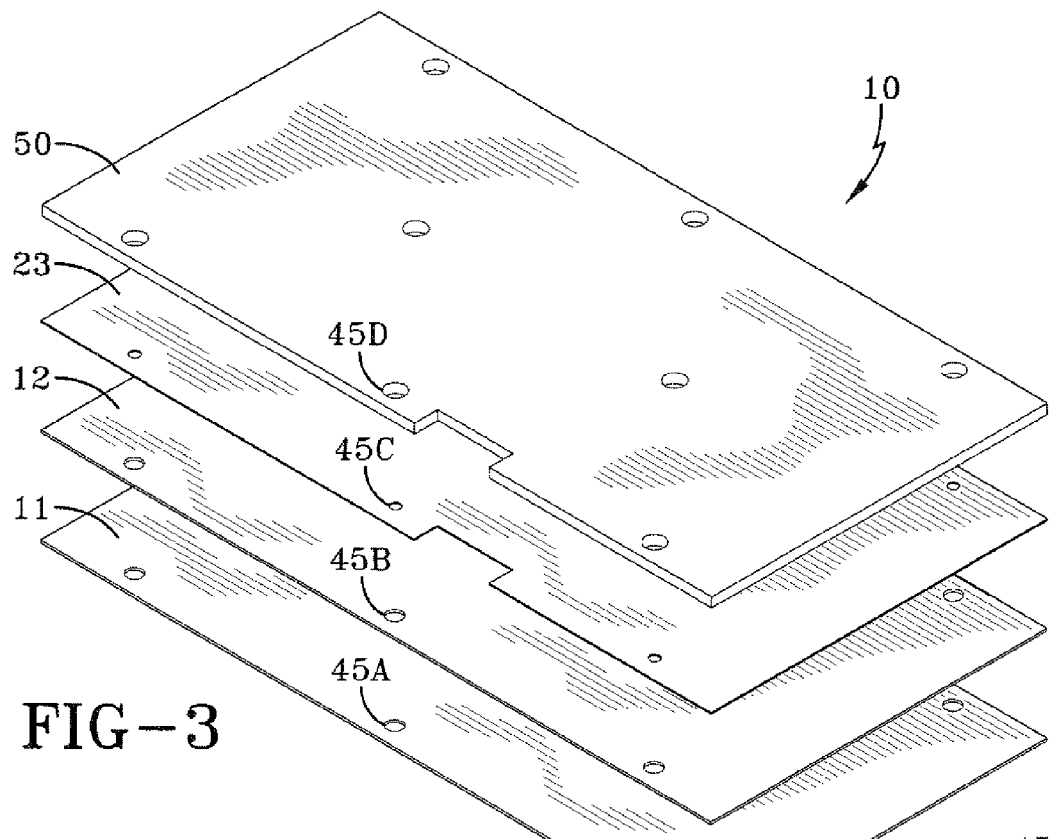
FIG. 3 is an exploded view of a multi-mode heater assembly according to the concepts of the present invention showing details of the first and second heaters, a support plate, and insulation.
Figure 5:
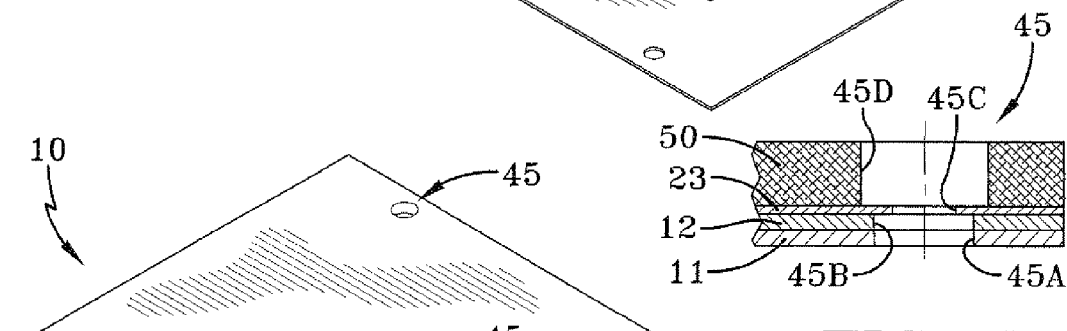
FIG. 5 is a fragmented cross sectional view as might be seen along line 5-5 in FIG. 4.
Figure 4:
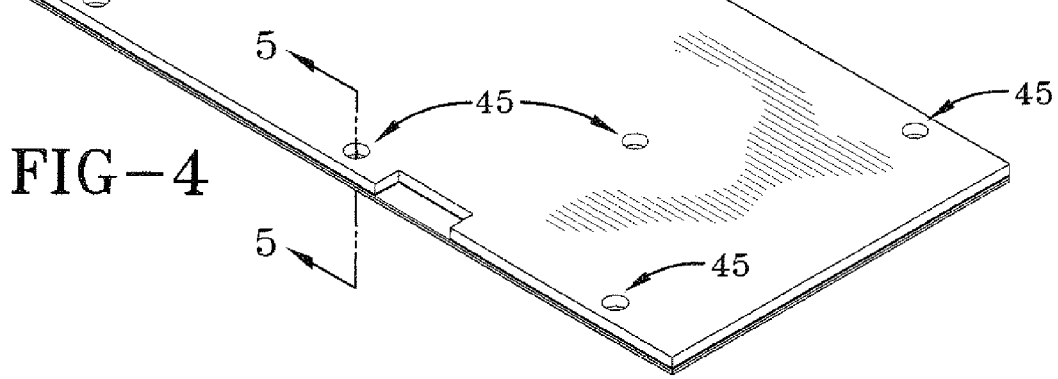
FIG. 4 is a perspective view of a multi-mode heater assembly showing details of a stacked heater configuration with support plate and insulation attached.

In terms of construction, first and second heaters 11, 12 may be resistance type heating elements or other heating elements known in the art. The first and second heaters 11, 12 may be thin pad heaters characterized as having at least one surface dimension that is greater than the thickness of the pad. In the example shown, the length and width surface dimensions are both greater than the thickness of heaters 11, 12. With reference to FIGS. 3-5, first and second heaters 11, 12 may be constructed by attaching a resistance wire to a steel sheet. For example, a resistance wire may be attached and encapsulated in a silicone elastimer and attached to steel sheet to form a thin pad heater. Heaters 11,12 may be arranged to apply heat to the same area of tank 15. For example, as shown, heaters 11,12 may be arranged in a stacked configuration so that they both apply heat to the same area of tank 15. In the example shown, the heaters 11,12 are stacked beneath a lower surface or base 16 of tank 15. In the stacked arrangement shown, the first heater 11 and second heater 12 may be bonded together. Bonding of the heaters 11,12 may be achieved by any suitable fastener or adhesive. In the depicted embodiment, heaters 11, 12 are stacked and bonded with mechanical fasteners, for example, bolts or screws (not shown), that sandwich the heaters 11,12 between a support plate 23 and tank 15. As best shown in FIGS. 4 and 5, to accommodate such fasteners, receivers, generally indicated by the number 45, may be formed in the heaters 11,12 (receivers 45A,45B) and support plate 23 (receivers 45C) to allow the fasteners (not shown) to pass therethrough and attach heater assembly 10 to tank 15. It will be appreciated that support plate 23 may be constructed of any material that is suitable for supporting the heaters 11,12.

Placement of the heater assembly 10 on the base 16 of tank 15 is believed to provide greater efficiency by taking advantage of the natural convection to distribute heat upward to the tank 15. While potentially less efficient, other configurations may be used within the concepts of the present invention. To reduce heat loss and improve the flow of heat from heaters 11, 12 to tank 15, insulation 50 may be provided around the exterior of heater assembly 10. For example an insulation pad 50 may be supported on bracket 20 below heaters 11,12 to insulate them from the ambient air. In the depicted example, insulation 50 is a closed cell foam insulation sheet material. In addition to or as an alternative, support plate 23 may be constructed from an material that has some insulating properties or wrapped or coated in heat shielding material to further reduce heat loss. In the example shown, insulation pad 50 is supported outward of support plate 23 to insulate heaters and shield users from the heat generated by heaters 11,12. As best shown in FIGS. 3 and 4 to facilitate attachment, insulation pad 50 may have receivers 45D corresponding to the receivers 45A, 45B, 45C respectively in heaters 11,12 and support plate 23 so that the heater assembly 10, support plate 23, and insulation 50 may be fastened to tank 15 with the same fasteners.

Overall, a heater assembly used in connection with a diesel exhaust fluid tank has been described and provides a new and useful addition to the art. It will be appreciated that various modifications and substitutions may be made to the described embodiments without departing from the scope of the present invention. Therefore, for an appreciation of the scope of the invention, reference is made to the following claims.

The invention claimed is:

1. A heater assembly used in connection with a diesel emissions fluid tank, the heater assembly comprising:
a first heater including a lower surface; and
a second heater including an upper surface;
said first heater and said second heater being bonded together in a stacked relationship and attachable to the fluid tank, wherein the lower surface of said first heater contacts the upper surface of said second heater;
wherein said first heater has a maximum power capability which is higher than a maximum power capability of said second heater,
wherein said first heater is connected to an AC voltage circuit only and said second heater is connected to a DC voltage circuit only,
wherein a control module thermostatically controls at least one of said first heater and said second heater in response to a diesel emission fluid temperature sensor reading;
wherein said first heater is configured to thaw frozen diesel emissions fluid and said second heater is configured to prevent freezing of the diesel emissions fluid.

2. The heater assembly of claim 1, wherein said first heater and said second heater are thin pad heating elements.

3. The heater assembly of claim 1, further comprising a support bracket attachable to the diesel emissions fluid tank, wherein said first heater and said second heater are supported by said support bracket, said second heater being supported adjacent to said first heater.

4. The heater assembly of claim 1, wherein said first heater includes a power cord adapted to plug into an external AC voltage circuit.

5. The heater assembly of claim 1 wherein said control module thermostatically controls said first heater in response to a diesel emission fluid temperature sensor reading.

6. The heater assembly of claim 1 further comprising a temperature sensor adapted to sense the temperature of a fluid within the diesel emissions fluid tank and in communication with a thermostat adapted to detect the temperature of said second heater, said control module being connected to a power supply and adapted to selectively activate or deactivate said second heater by selectively supplying current from said power supply to said second heater based on feedback from said thermostat.

7. The heater assembly of claim 1 further comprising a thermostat adapted to monitor the surface temperature of said second heater and selectively deactivate said second heater upon detecting a selected surface temperature.

8. The heater assembly of claim 1, wherein said first heater and said second heater apply heat to the same area of the tank.

9. The heater assembly of claim 1, further comprising insulation covering an exterior of said heater assembly.

10. A heater assembly used in connection with a diesel emissions fluid tank in a vehicle, the heater assembly comprising:
a first heater is connected only to an alternating current power supply;
a second heater is connected only to a direct current power supply within the vehicle;
wherein said first heater has a maximum power capability which is higher than a maximum power capability of said second heater;
wherein said first heater is configured to thaw frozen diesel emissions fluid and said second heater is configured to prevent freezing of the diesel emissions fluid;
said first and second heater being bonded together in a stacked relationship and attachable to the tank, wherein said first heater is closer to the tank than the second heater;
a temperature sensor in sensing communication with the tank and adapted to provide a tank temperature;
a control module connected to said second heater and the direct current power supply within the vehicle, wherein said temperature sensor communicates said tank temperature to said control module, wherein said control module selectively connects at least one of said first heater to said alternating current power supply and said second heater to said direct current power supply to obtain a desired tank temperature.

11. A heater assembly in combination with a diesel emissions fluid tank, the combination comprising:
a diesel emissions fluid tank;
a first heater including a lower surface; and
a second heater including an upper surface;
said first heater and said second heater being bonded together in a stacked relationship and attached to the fluid tank, wherein the lower surface of said first heater contacts the upper surface of said second heater;
said fluid tank having a base and adapted to hold a diesel emissions fluid;
said first heater being attached to an exterior surface of said fluid tank;
said second heater being supported outward of said first heater relative to said fluid tank,
wherein said first heater has a maximum power capability which is higher than a maximum power capability of said second heater;
wherein said first heater is configured to thaw frozen diesel emissions fluid and said second heater is configured to prevent freezing of the diesel emissions fluid;
wherein said first heater is connected to an AC voltage circuit only and said second heater is connected to a DC voltage circuit only.

12. The heater assembly and fluid tank combination of claim 11, wherein said first heater and said second heater apply heat to the same area of said fluid tank.

13. The heater assembly and fluid tank combination of claim 11 further comprising a heater support attached to said base of said tank, wherein said first heater and said second heater are mounted to said fluid tank by said support and apply heat to said base of said fluid tank.

14. The heater assembly and fluid tank combination of claim 13 wherein said heater support includes a support bracket and a support plate mounted on said support bracket, wherein said support plate extends below said second heater.

15. The heater assembly and fluid tank combination of claim 11, wherein said first heater and said second heater are thin pad heaters.

16. The heater assembly and fluid tank combination of claim 11, wherein said first heater contacts said base of said fluid tank.

17. The heater assembly and fluid tank combination of claim 15, further comprising insulation attached to said heater assembly and located outward of said second heater.

18. The heater assembly and fluid tank combination of claim 11 wherein said heater assembly is located outside of said fluid tank.

\* \* \* \* \*